United States Patent
Takamura et al.

(10) Patent No.: US 9,032,044 B2
(45) Date of Patent: May 12, 2015

(54) INFORMATION PROCESSING SYSTEM, INFORMATION PROCESSING METHOD, PROGRAM, AND NON-TRANSITORY INFORMATION STORAGE MEDIUM

(75) Inventors: Seiichi Takamura, Tokyo (JP); Takayuki Ishida, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 288 days.

(21) Appl. No.: 13/602,570

(22) Filed: Sep. 4, 2012

(65) Prior Publication Data

US 2013/0067028 A1 Mar. 14, 2013

(30) Foreign Application Priority Data

Sep. 8, 2011 (JP) .................................. 2011-195936

(51) Int. Cl.
*G06Q 50/00* (2012.01)
*A63F 13/40* (2014.01)
*A63F 13/30* (2014.01)
*H04L 29/06* (2006.01)
*H04L 12/58* (2006.01)

(52) U.S. Cl.
CPC ................ *G06Q 50/01* (2013.01); *A63F 13/12* (2013.01); *A63F 13/10* (2013.01); *H04L 67/38* (2013.01); *H04L 51/04* (2013.01)

(58) Field of Classification Search
USPC ................................................. 709/217, 219
See application file for complete search history.

(56) References Cited

U.S. PATENT DOCUMENTS

| 8,301,708 | B2 * | 10/2012 | Asami ........................... 709/206 |
|---|---|---|---|
| 8,306,346 | B2 * | 11/2012 | Lin ................................ 382/243 |
| 8,360,843 | B2 * | 1/2013 | Barclay et al. ................... 463/16 |
| 2009/0325661 | A1 * | 12/2009 | Gross ................................ 463/9 |
| 2010/0075759 | A1 * | 3/2010 | Kawabata ........................ 463/42 |
| 2011/0244957 | A1 * | 10/2011 | Nishimura et al. ............. 463/31 |
| 2011/0269548 | A1 * | 11/2011 | Barclay et al. ................... 463/42 |
| 2012/0021827 | A1 * | 1/2012 | Raitt et al. ....................... 463/31 |
| 2012/0236201 | A1 * | 9/2012 | Larsen et al. .................. 348/468 |
| 2012/0264511 | A1 * | 10/2012 | Marsland et al. ............... 463/31 |
| 2012/0295705 | A1 * | 11/2012 | Hanawa .......................... 463/31 |
| 2012/0309543 | A1 * | 12/2012 | Shimada ......................... 463/42 |
| 2013/0017889 | A1 * | 1/2013 | Kozlov ............................ 463/42 |
| 2013/0027414 | A1 * | 1/2013 | Ueda et al. ..................... 345/522 |
| 2013/0053142 | A1 * | 2/2013 | Kress et al. ...................... 463/31 |
| 2013/0073389 | A1 * | 3/2013 | Heath ........................ 705/14.54 |
| 2013/0102374 | A1 * | 4/2013 | Barclay et al. ................... 463/16 |
| 2013/0102382 | A1 * | 4/2013 | Barclay et al. ................... 463/25 |
| 2013/0190081 | A1 * | 7/2013 | Naik et al. ...................... 463/29 |
| 2013/0268357 | A1 * | 10/2013 | Heath ........................ 705/14.53 |

* cited by examiner

*Primary Examiner* — Sargon Nano
(74) *Attorney, Agent, or Firm* — Matthew B. Dernier, Esq.; Gibson & Dernier LLP

(57) ABSTRACT

A search management unit or a data acquisition unit acquires information according to experience contents of a provision destination user to which information is provided. A transition data identifying unit identifies information according to experience contents of a provision source user being a user whose experience contents are brought into correspondence with the experience contents of the provision destination user. An information providing unit provides the provision destination user with the information according to the experience contents of the provision source user. With the above-mentioned configuration, it is possible to promote sharing of experiences among a plurality of users.

9 Claims, 12 Drawing Sheets

| PROGRESS STATUS MANAGEMENT ID | USER ID | GAME ID | NAME DATA | GRADE DATA | ACHIEVEMENT MANAGEMENT DATA | ACHIEVEMENT DATE/TIME DATA |
|---|---|---|---|---|---|---|
| 0001 | 0111 | 001 | WARRIOR... | GOLD | UNACHIEVED | |
| 0002 | 0111 | 001 | SAGE... | GOLD | ACHIEVED | 2011/06/30 14:15:30 |

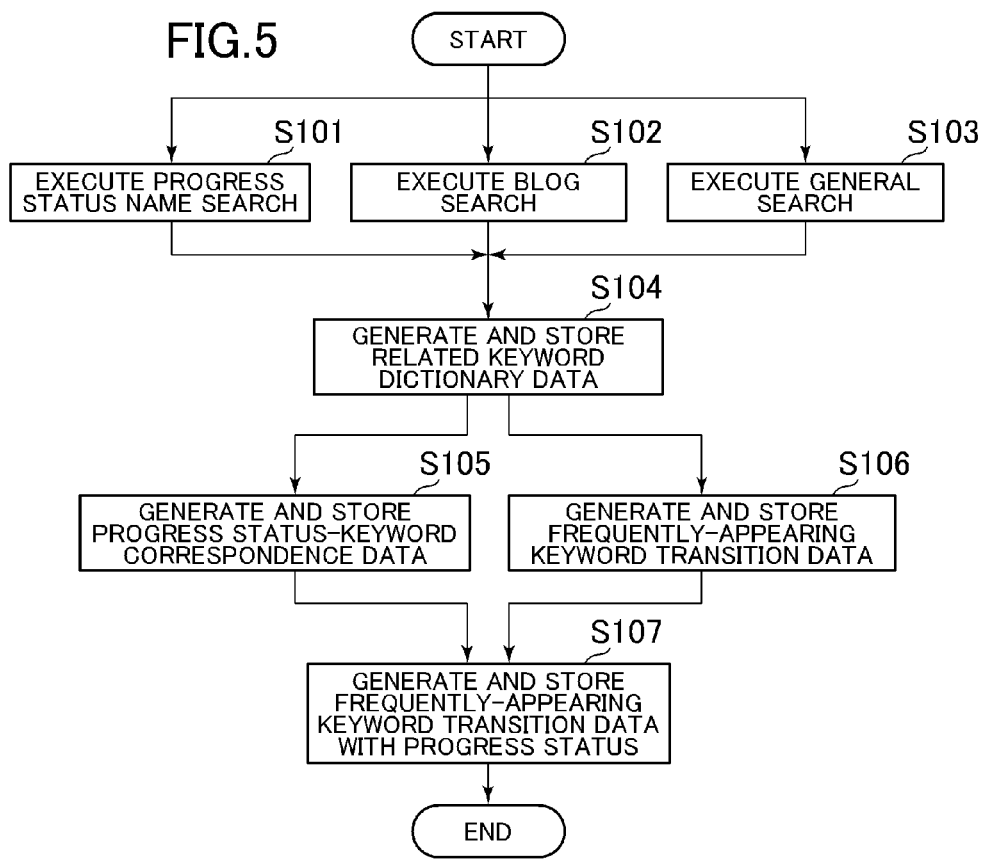
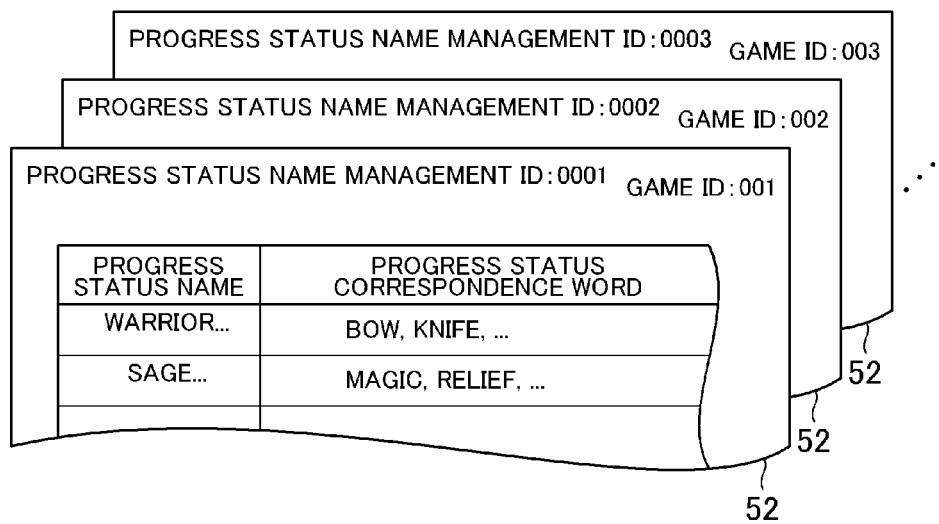

| RELATED KEYWORD DICTIONARY ID | GAME ID | KEYWORD DATA | |
|---|---|---|---|
| 0001 | 001 | INTERESTING, DIFFICULT, ... | } 56 |
| 0002 | 002 | ITEM, BOSS, ... | } 56 |
| | | | |

| PROGRESS STATUS-KEYWORD CORRESPONDENCE ID | GAME ID | PROGRESS STATUS NAME | KEYWORD DATA | |
|---|---|---|---|---|
| 0001 | 001 | WARRIOR... | BOW, KNIFE, BOW&ARROW, ... | } 58 |
| 0002 | 001 | SAGE... | MAGIC, RELIEF, MAGICALPOWER, ... | } 58 |
| | | | | |

INFORMATION PROCESSING SYSTEM, INFORMATION PROCESSING METHOD, PROGRAM, AND NON-TRANSITORY INFORMATION STORAGE MEDIUM

CROSS-REFERENCE TO RELATED APPLICATION

The present application claims priority from Japanese application JP 2011-195936 filed on Sep. 8, 2011, the content of which is hereby incorporated by reference into this application.

BACKGROUND OF THE INVENTION

1. Field of the Invention

The present invention relates to an information processing system, an information processing method, a program, and a non-transitory information storage medium.

2. Description of the Related Art

There exist various kinds of social media which enable users thereof to easily offer information. Examples of the social media include an electronic bulletin board, a blog, a wiki, social bookmarking, Twitter (trademark), and a social networking service. In the social media, experience contents of users are increasingly made public by the users in various different formats, for example, blog articles, comments posted on electronic bulletin boards, and moving images uploaded on servers. Examples of the contents being increasingly made public in the social media include various kinds of information according to progress of the game, such as a strategy method for a stage and a method of acquiring an item, various kinds of information according to a progress status of contents learned through learning content or a tutorial for application software, various kinds of information according to music in which a user has become interested after listing thereto, various kinds of information according to fish landed by the user, various kinds of information according to liquor that the user has found tasty, and various kinds of information according to a progress status of a diet, a smoking cessation, or the like. Further, there exists a system that manages a progress status of a game of a user by associating data representing the progress status of the game of the user with an identifier of the user and storing the associated data.

SUMMARY OF THE INVENTION

There may exist a plurality of users who are brought into correspondence with such experience contents as described above. In this case, a given user can be provided with information according to the experience contents of other users whose experience contents are brought into correspondence with those of the given user, to thereby promote sharing of experiences among the given user and the other users. However, there is no related art that promotes the sharing of the experiences among a plurality of users by providing a given user with the information according to the experience contents of the other users.

The present invention has been made in view of the above-mentioned problem, and an object of some embodiments of the invention is to promote sharing of experiences among a plurality of users.

In order to solve the above-mentioned problem, according to an exemplary embodiment of the present invention, there is provided an information processing system, including: an acquisition unit that acquires information according to experience contents of a provision destination user to which information is to be provided; an information identifying unit that identifies information according to experience contents of a provision source user being a user whose experience contents are brought into correspondence with the experience contents of the provision destination user; and an information providing unit that provides the provision destination user with the information according to the experience contents of the provision source user.

Further, according to an exemplary embodiment of the present invention, there is provided an information processing method, including: acquiring information according to experience contents of a provision destination user to which an information is to be provided; identifying information according to the experience contents of a provision source user being a user whose experience contents are brought into correspondence with the experience contents of the provision destination user; and providing the provision destination user with the information according to the experience contents of the provision source user.

Further, according to an exemplary embodiment of the present invention, there is provided a program stored in a non-transitory computer readable information storage medium, which is to be executed by a computer, the program including instructions to: acquire information according to experience contents of a provision destination user to which information is to be provided; identify information according to the experience contents of a provision source user being a user whose experience contents are brought into correspondence with the experience contents of the provision destination user; and provide the provision destination user with the information according to the experience contents of the provision source user.

Further, according to an exemplary embodiment of the present invention, there is provided a non-transitory computer readable information storage medium storing a program which is to be executed by a computer, the program including instructions to: acquire information according to experience contents of a provision destination user to which information is to be provided; identify information according to the experience contents of a provision source user being a user whose experience contents are brought into correspondence with the experience contents of the provision destination user; and provide the provision destination user with the information according to the experience contents of the provision source user.

According to the exemplary embodiment of the present invention, the provision destination user is provided with information according to experience contents of the provision source user whose experience contents is brought into correspondence with that of the provision destination user, which promotes sharing of experiences among the plurality of users.

According to the exemplary embodiment of the present invention, the information processing system further includes a data generation unit that generates data representing a plurality of words ordered in accordance with an order of experiences based on information according to the experience contents of the user, and the information providing unit provides the provision destination user with information according to a word identified from among the plurality of words based on information representing the experience contents of the provision destination user.

Further, according to the exemplary embodiment of the present invention, the data generation unit generates, based on a plurality of pieces of document information each of which is associated with a date/time, data in which a plurality of words included in the plurality of pieces of document information are ordered in accordance with an order of the date/time associated with each of the plurality of pieces of document information including the plurality of words.

Further, according to the exemplary embodiment of the present invention, the data generation unit generates a plurality of data pieces representing the plurality of words, the information processing system further includes a data identifying unit that identifies, based on the information according to the experience contents of the provision destination user, at least one of the plurality of data pieces representing the plurality of words brought into correspondence with the information, and the information providing unit provides the provision destination user with information according to a word identified from among the plurality of words represented by the at least one of the plurality of data pieces identified by the data identifying unit.

Further, according to the exemplary embodiment of the present invention, the data generation unit generates the data representing the plurality of words based on a name of experience contents data representing the experience contents of the user stored in a management system that manages the experience contents of the user and document information stored in a social media system in which content registered by the user is made public, and at least one of the plurality of words is a word brought into correspondence with the experience contents data, and at least one of the plurality of words is a word brought into correspondence with the document information.

Further, according to the exemplary embodiment of the present invention, the acquisition unit acquires information according to progress of a game of the provision destination user, the information identifying unit identifies information according to progress of the game of the provision source user being a user whose progress of the game is brought into correspondence with the progress of the game of the provision destination user, and the information providing unit provides the provision destination user with information according to the progress of the game of the provision source user.

BRIEF DESCRIPTION OF THE DRAWINGS

In the accompanying drawings:

FIG. 5 is a flowchart illustrating an example of a flow of processing performed by the information providing system according to the embodiment of the present invention;

FIG. 6 is a diagram illustrating an example of progress status name management data;

DETAILED DESCRIPTION OF THE INVENTION

Figure 1:
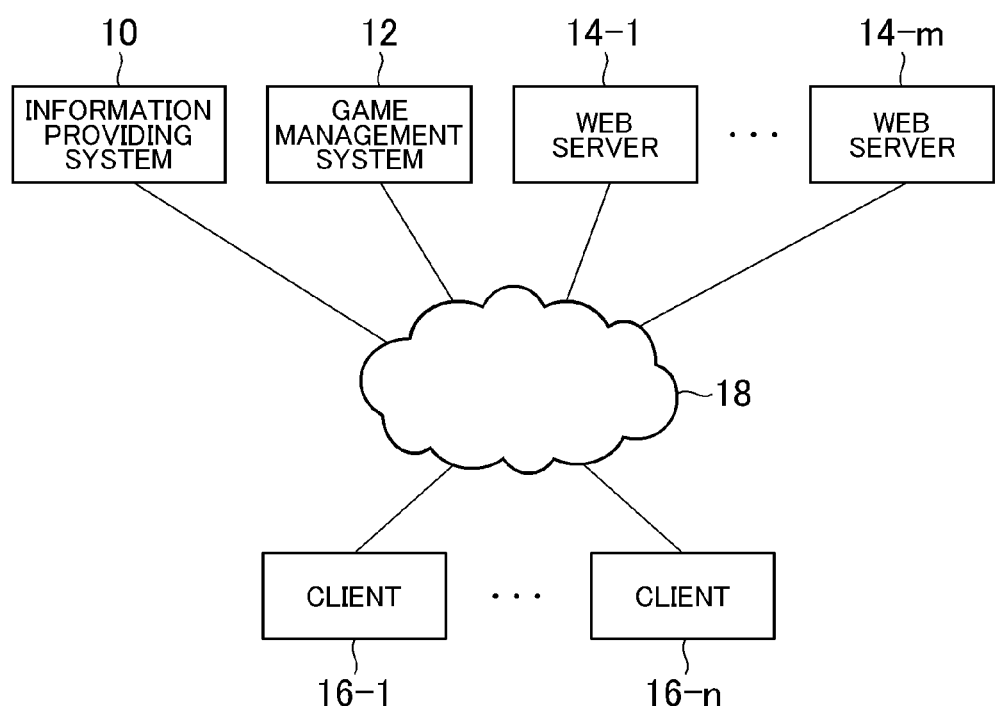
FIG. 1 is an overall configuration diagram of a computer network according to an embodiment of the present invention.

Hereinafter, an embodiment of the present invention is described in detail below referring to the drawings.

FIG. 1 is a diagram illustrating an overall configuration of a computer network 18 according to the embodiment of the present invention. As illustrated in FIG. 1, an information providing system 10, a game management system 12, web servers 14 (14-1 to 14-*m*) and clients 16 (16-1 to 16-*n*), which are all constructed based on computers, are connected to the computer network 18 such as the Internet. The information providing system 10, the game management system 12, the web servers 14, and the clients 16 can communicate to/from one another.

The information providing system 10 is a computer system including at least one server functioning as an information processing system according to this embodiment. The game management system 12 is a computer system including at least one server that manages data relating to a user who plays a game. The web server 14 is a server that provides a web page or the like. Some web servers 14 provide social media services that causes content received from users to be made public (for example, electronic bulletin board, blog, wiki, social bookmarking, Twitter (trademark), and social networking service).

Each of the information providing system 10, the game management system 12 and the web servers 14 includes, for example, a control unit that is a program control device such as a central processing unit (CPU) which operates in accordance with a program installed in the own device, a storage unit that is a storage element such as a read-only memory (ROM) or a random access memory (RAM), or a hard disk drive, and a communication unit that is a communication interface such as a network board. Those elements are interconnected to each other via a bus. Each of the storage units of the information providing system 10, the game management system 12, and the web servers 14 stores a program executed by the control unit of the own device. Each of the storage units of the information providing system 10, the game management system 12, and the web servers 14 also operates as a work memory of the own device.

The client 16 is, for example, a computer such as a personal computer, a game console, a television set, a portable game device, or a portable information terminal. The client 16 includes, for example, a control unit such as a CPU, a storage unit such as a storage element including a ROM or a RAM, or a hard disk drive, an output unit such as a display or a speaker, an input unit such as a game controller, a touch pad, a mouse, a keyboard, or a microphone, a communication unit such as a network board, and an optical disc drive unit that reads an optical disc (computer readable non-transitory information storage medium) such as a digital versatile disc (DVD)-ROM or Blu-ray (trademark) disc.

The client 16 of this embodiment has a web browser installed therein in advance. Further, in this embodiment, after the client 16 accesses and logs in to the information providing system 10 by inputting a user ID and a password that are registered in the information providing system 10 and then accesses a predetermined URL, a screen corresponding to the predetermined URL is displayed on the display of the client 16 through the web browser. Note that, the information providing system 10 is configured to be able to identify the user ID of the user who is using the client 16 by, for example, referring to a session ID after the user ID and the password are inputted to the screen corresponding to the predetermined URL.

Figure 2:
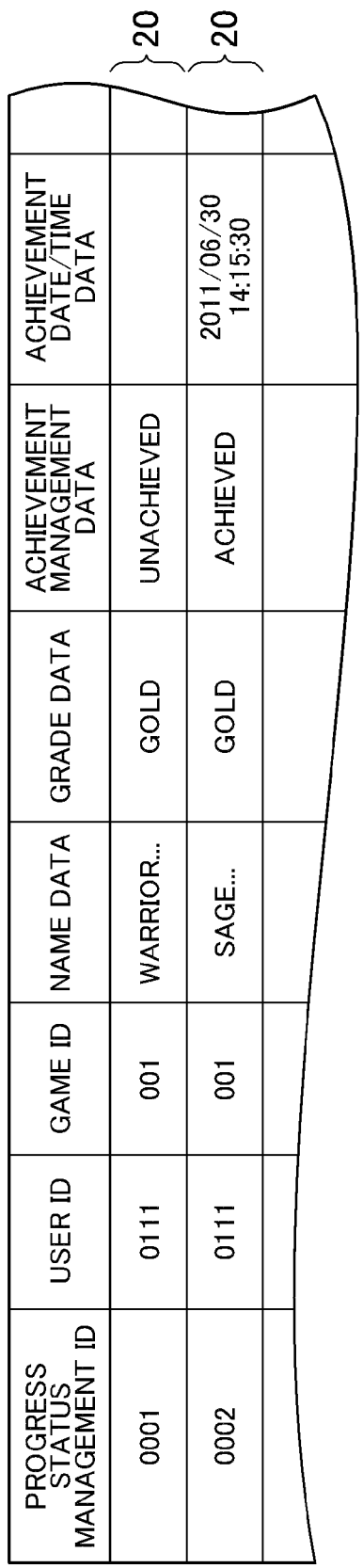
FIG. 2 is a diagram illustrating an example of progress status management data.

The game management system 12 according to this embodiment stores information relating to the user who plays the game. The game management system 12 stores a plurality of records of account data each of which includes, for example, the user ID, a name, an address, a telephone number, and an electronic mail address of the user who plays the game. Further, the game management system 12 stores progress status management data 20 for managing a progress status of the game of the user which is exemplified in, for example, FIG. 2. The progress status management data 20 includes, for example, a progress status management ID being an identifier of the progress status management data 20, the user ID being an identifier of the user whose progress status of the game is managed by the progress status management data 20, a game ID being an identifier of the game associated with the progress status management data 20, name data representing a name of the progress status managed by the progress status management data 20, grade data representing a grade (specifically, any one of, for example, "bronze", "silver", and "gold") of the progress status, achievement management data indicating whether or not the user has achieved, in the game, a condition corresponding to the progress status management data 20 (for example, has cleared a predetermined stage, has acquired a predetermined item, or has beaten down a predetermined number of enemies in the game), and achievement date/time data representing a date/time at which the user has achieved the condition corresponding to the progress status management data 20 in the game. Values that can be taken by the achievement management data are, for example, "unachieved" and "achieved". Under the condition that a predetermined condition is achieved by the user who plays the game corresponding to the game ID, the game management system 12 according to this embodiment updates the value of the achievement management data corresponding to the condition from "unachieved" to "achieved" and sets the achieved date/time as the value of the achievement date/time data.

Further, a web page on which a title of a game and a list of names of progress statuses brought into correspondence with the game are placed for each of a plurality of games (hereinafter, referred to as "progress status name page") is registered on some of the web servers 14 according to this embodiment.

The web server 14 according to this embodiment for providing a social media service is configured to be able to receive a post of content such as a comment from the client 16. The posted content is stored in the storage section included in the web server 14. Then, the web server 14 transmits the posted content to the client 16 in response to a request received from the client 16. Under the condition that receiving the content, the client 16 displays the content on the display. In this manner, the posted content is made public by the user.

Figure 3:
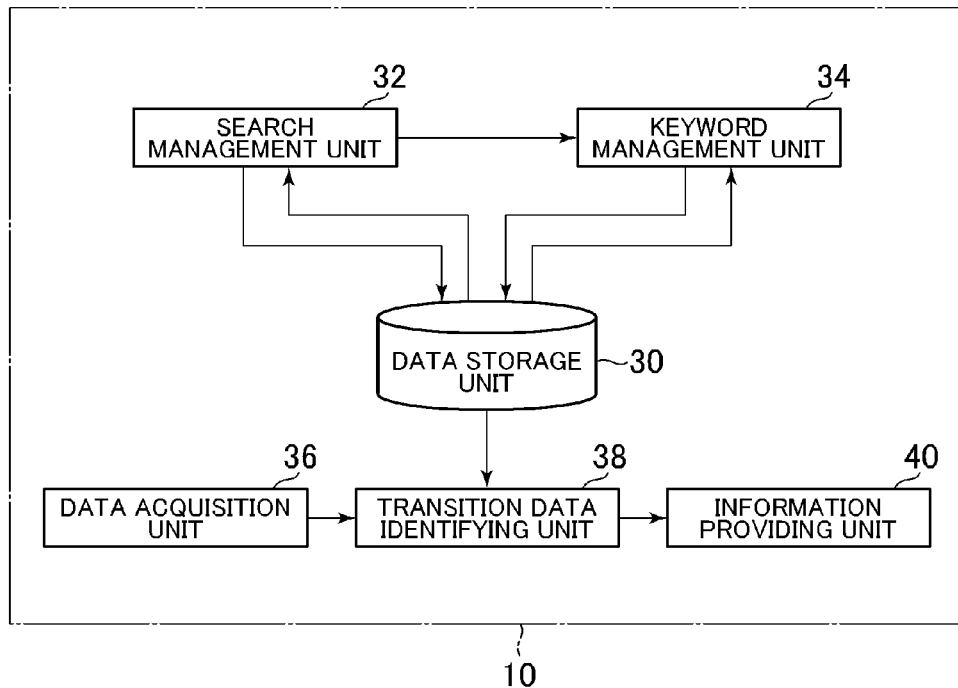
FIG. 3 is a functional block diagram illustrating an example of functions implemented by an information providing system according to the embodiment of the present invention.

FIG. 3 is a functional block diagram illustrating an example of functions implemented by the information providing system 10 according to this embodiment. As illustrated in FIG. 3, the information providing system 10 functionally includes a data storage unit 30, a search management unit 32, a keyword management unit 34, a data acquisition unit 36, a transition data identifying unit 38, and an information providing unit 40. The data storage unit 30 is mainly implemented by the storage section included in the information providing system 10. The other elements are implemented mainly by the control unit included in the information providing system 10.

Those functions are implemented by executing a program according to this embodiment in the information providing system 10 that is a computer. This program may be downloaded from another computer via a communication interface through a computer communication network, or may be stored in a computer readable non-transitory information storage medium such as an optical disc (for example, CD-ROM, DVD-ROM, or Blu-ray disc) or a universal serial bus (USB) memory and installed in the information providing system 10 therefrom via an optical disc drive, a USB port, or the like.

In this embodiment, the data storage unit 30 previously stores a plurality of pieces of game master data being data brought into correspondence with games managed by the information providing system 10. The game master data includes, for example, the game ID, game title data representing the name of the game, and released date/time data representing a date/time at which the game was released.

Figure 4:
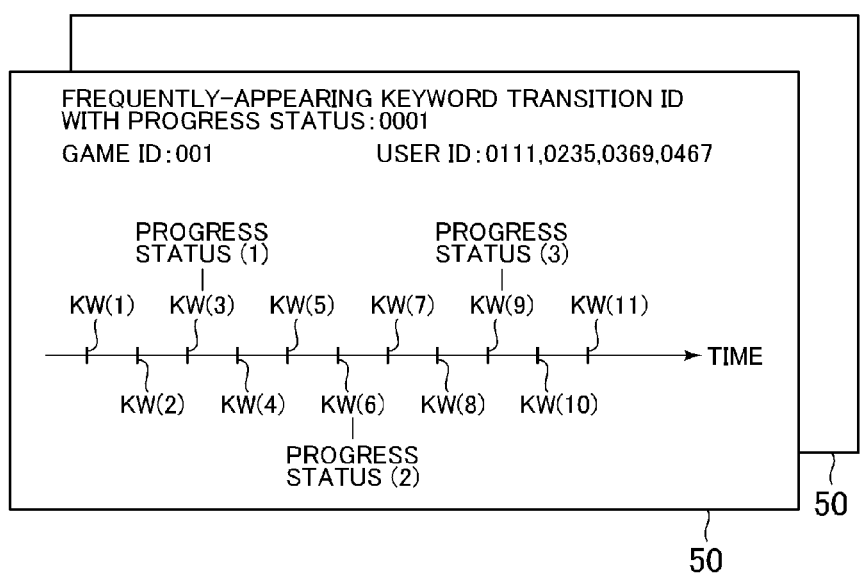
FIG. 4 is a diagram illustrating an example of frequently-appearing keyword transition data with a progress status.

The information providing system 10 according to this embodiment generates frequently-appearing keyword transition data with a progress status 50, which is brought into correspondence with each of the plurality of games and which is exemplified in FIG. 4, at predetermined timings (for example, at predetermined time intervals). FIG. 4 is a diagram illustrating an example of the frequently-appearing keyword transition data with the progress status 50. In this embodiment, the frequently-appearing keyword transition data with the progress status 50 is brought into correspondence with a game represented by the game master data. Note that, the information providing system 10 according to this embodiment may generate a plurality of pieces of frequently-appearing keyword transition data with the progress status 50 corresponding to one game.

Further, in this embodiment, the frequently-appearing keyword transition data with the progress status 50 includes a plurality of ordered elements. In this processing example, the respective elements represent keywords relating to the game brought into correspondence with the frequently-appearing keyword transition data with the progress status 50. In the frequently-appearing keyword transition data with the progress status 50 of FIG. 4, the plurality of the keywords are respectively expressed as KW(1), KW(2), KW(3), KW(4), KW(5), KW(6), KW(7), KW(8), KW(9), KW(10), and KW(11). Further, some of the elements representing the keywords relating to the game included in the frequently-appearing keyword transition data with the progress status 50 may be associated with the progress status of the game (for example, associated with the name of the progress status of the game). In FIG. 4, the progress statuses associated with the keywords are respectively expressed as a progress status (1), a progress status (2), and a progress status (3). In the frequently-appearing keyword transition data with the progress status 50 of FIG. 4, KW(3) is associated with the progress status (1), KW(6) is associated with the progress status (2), and KW(9) is associated with the progress status (3). In this embodiment, the respective elements are brought into correspondence with times, and the order of the respective elements included in the frequently-appearing keyword transition data with the progress status 50 corresponds to the order of the times brought into correspondence with the elements. Note that, in the example of FIG. 4, the time brought into correspondence with the element placed on the right side is later than the time brought into correspondence with the element placed on the left side.

Here, by referring to a flowchart illustrated in FIG. 5, a description is made of an example of a flow of processing that is performed by the information providing system 10 according to this embodiment in order to generate the frequently-appearing keyword transition data with the progress status 50. In this embodiment, a series of processing illustrated in FIG. 5 are executed at predetermined timings (for example, at predetermined time intervals).

First, for each of the games managed by the game title data which is stored in the data storage unit 30, the search management unit 32 executes a search relating to the name of the progress status (hereinafter, referred to as "progress status name search") (S101), a search through at least one blog article associated with a combination of the user and a posted date/time (hereinafter, referred to as "blog search") (S102), and a search through at least one previously determined web page (such as web page on which comments posted on a wiki web page or an electronic bulletin board are written) (hereinafter, referred to as "general search") (S103). The search management unit 32 may execute the processing illustrated as Steps S101 to S103 either in parallel or in order. Further, the processing illustrated as Steps S101 to S103 is executed in an arbitrary order.

Hereinafter, the progress status name search (S101) is described. First, the search management unit 32 executes a search, which uses a game title of a game subjected to the processing as a search condition, on the web server 14 on which a plurality of progress status name pages are registered, and acquires the progress status name page including the game title used as the search condition. Then, the search management unit 32 extracts the name of at least one progress status (hereinafter, referred to as "progress status name") included in the acquired progress status name page.

Then, for each of the extracted progress status names, the search management unit 32 executes a search, which uses the progress status name as the search condition, on various web pages registered in the web server 14, and acquires the web page including the progress status name used as the search condition. Then, based on the acquired web page, the search management unit 32 identifies at least one word included in a text (text information) written on the web page. In this embodiment, the search management unit 32 extracts the word included in the acquired web page by executing, for example, a morphological analysis on the text written on the acquired web page. Note that, here, the search management unit 32 may be configured to extract a word satisfying a predetermined condition (for example, word included a predetermined or larger number of times or word that matches the previously determined word or is similar thereto). Hereinafter, at least one word extracted in such a manner is referred to as "progress status correspondence word". In this manner, at least one progress status name brought into correspondence with the game and at least one progress status correspondence word brought into correspondence with the progress status name are extracted for each of the games represented by the game master data.

Then, for each of the games represented by the game master data, the search management unit 32 generates progress status name management data 52 exemplified in FIG. 6 and stores the progress status name management data 52 in the data storage unit 30. The progress status name management data 52 includes, for example, a progress status name management ID being an identifier of the progress status name management data 52, the game ID corresponding to the game title used as the search condition, at least one progress status name extracted based on the game title, and the at least one progress status correspondence word brought into correspondence with each of the progress status names. In this manner, the progress status name management data 52 brought into correspondence with each of the games represented by the game master data is generated.

Next, the blog search (S102) is described. First, for each of the games represented by the game master data, the search management unit 32 executes the search, which uses the game title as the search condition, on at least one web page in which the user's blog article is registered, and acquires at least one blog article including the game title. Note that, at this time, the search management unit 32 may be configured to acquire at least one blog article posted after a released date/time of the game brought into correspondence with the game title. In this embodiment, at least one blog article acquired by the search management unit 32 includes various kinds of information according to progress of the game such as a strategy method for a stage and a method of acquiring an item. As described above, in this embodiment, the search management unit 32 also plays a role of an acquisition unit for acquiring information according to the progress of the game of the user. Then, the search management unit 32 identifies at least one word based on the text written as the blog article for each of the acquired blog articles. In this embodiment, the search management unit 32 identifies the at least one word extracted by, for example, executing the morphological analysis on the text of the blog article. Note that, here, the search management unit 32 may be configured to extract a word satisfying a predetermined condition (for example, word included a predetermined or larger number of times or word that matches a previously determined word or is similar thereto). Hereinafter, the word identified in such a manner is referred to as "blog constituent word". In this manner, the extraction of at least one blog constituent word, each of which is brought into correspondence with a combination of the game and the blog article, is performed.

Figure 7:
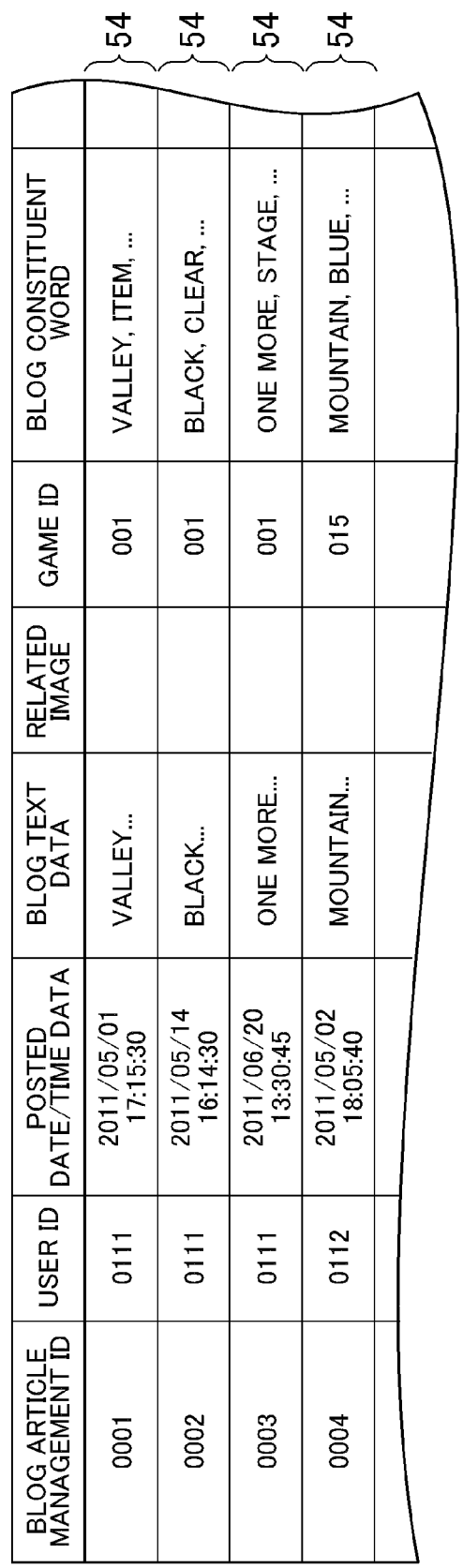
FIG. 7 is a diagram illustrating an example of blog article management data.

Then, the search management unit 32 generates blog article management data 54 exemplified in FIG. 7, which is brought into correspondence with the combination of the game and the blog article, and stores the blog article management data 54 in the data storage unit 30. The blog article management data 54 includes, for example, a blog article management ID being an identifier of the blog article management data 54, the user ID being the identifier of the user who posted the blog article, posted date/time data representing the posted date/time of the blog article, blog text data representing the text written as the blog article, a related image representing an image or a moving image registered as a part of the blog article, the game ID corresponding to the game title used as the search condition, and the at least one blog constituent word extracted from the blog article based on the game title used as the search condition.

Then, for each of the games represented by the game master data, the search management unit 32 extracts a word (or words) satisfying a previously determined condition (for example, word included in the text a predetermined or larger number of times or word that matches a previously determined word or is similar thereto) as an important word (or important words) from among words included, as the blog constituent words, in any one piece of blog article management data 54 that includes the game ID of the game. Then, the search management unit 32 generates important word management data based on the extracted important word, and stores the important word management data in the data storage unit 30. The important word management data includes, for example, an important word management ID being an identifier of the important word management data, the game ID associated with the game title used as the search condition, and at least one of the important words that has been extracted. Note that, in a case where the data storage unit 30 stores important word management data including the same game ID as the generated important word management data, the search management unit 32 overwrites the important word management data.

Next, the general search (S103) is described. First, for each of the games represented by the game master data, the search management unit 32 executes the search, which uses the game title as the search condition, on at least one previously determined web page (for example, web page on which comments posted on a wiki web page or an electronic bulletin board are written) that is different from the target of the above-mentioned progress status name search or the blog search, and acquires at least one web page including the game title. Then, the search management unit 32 identifies at least one word based on the text described on the web page for each of the acquired web pages. In this embodiment, the search management unit 32 identifies the word extracted by, for example, executing the morphological analysis on the text written on the web page. Hereinafter, the word identified in such a manner is referred to as "general text constituent word". In this manner, the extraction of at least one general text constituent word, each of which is brought into correspondence with the game, is performed.

Then, the search management unit 32 generates general text management data, and stores the general text management data in the data storage unit 30. The general text management data includes, for example, a general text management ID being an identifier of the general text management data, the game ID corresponding to the game title used as the search condition, and the at least one general text constituent word identified by the above-mentioned search using the game title as the search condition.

Figures 8, 9, 10:
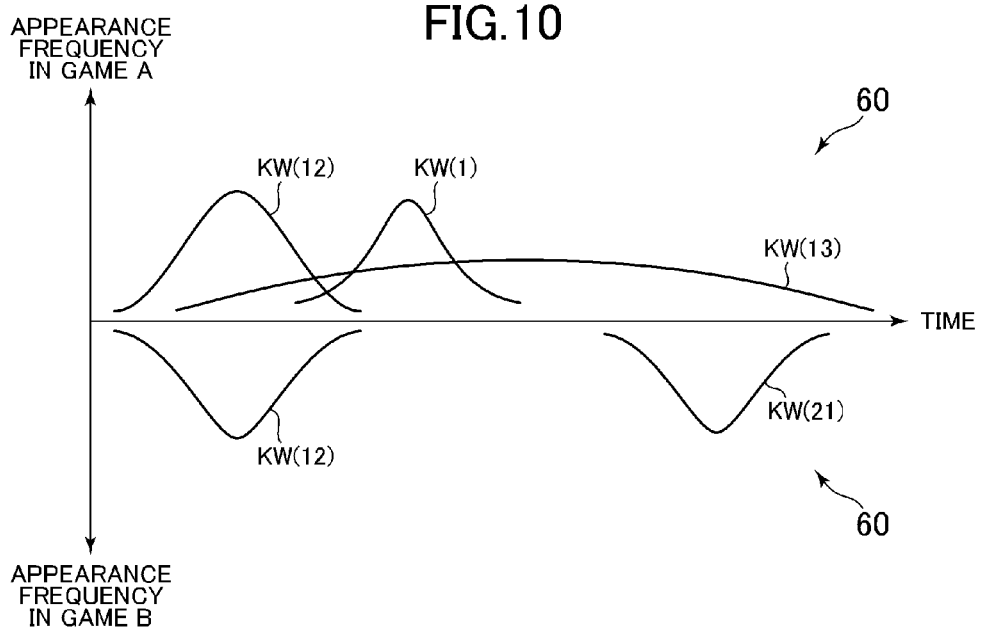
FIG. 8 is a diagram illustrating an example of related keyword dictionary data.
FIG. 9 is a diagram illustrating an example of progress status-keyword correspondence data.
FIG. 10 is a diagram illustrating an example of histograms.

Then, after the above-mentioned processing illustrated as Steps S101 to S103, for each of the games represented by the game master data, the keyword management unit 34 generates related keyword dictionary data 56 exemplified in FIG. 8, and stores the related keyword dictionary data 56 in the data storage unit 30 (S104). The related keyword dictionary data 56 includes, for example, related keyword dictionary ID being an identifier of the related keyword dictionary data 56, the game ID of the game brought into correspondence with the related keyword dictionary data 56, and keyword data. The keyword management unit 34 sets, for example, as words included in the keyword data, at least a part of: the blog constituent word included in any one piece of blog article management data 54 including the game ID included in the related keyword dictionary data 56; and the general text constituent word included in the general text management data including the game ID. In this manner, the related keyword dictionary data 56 brought into correspondence with each of the games represented by the game master data is generated.

Figure 12:
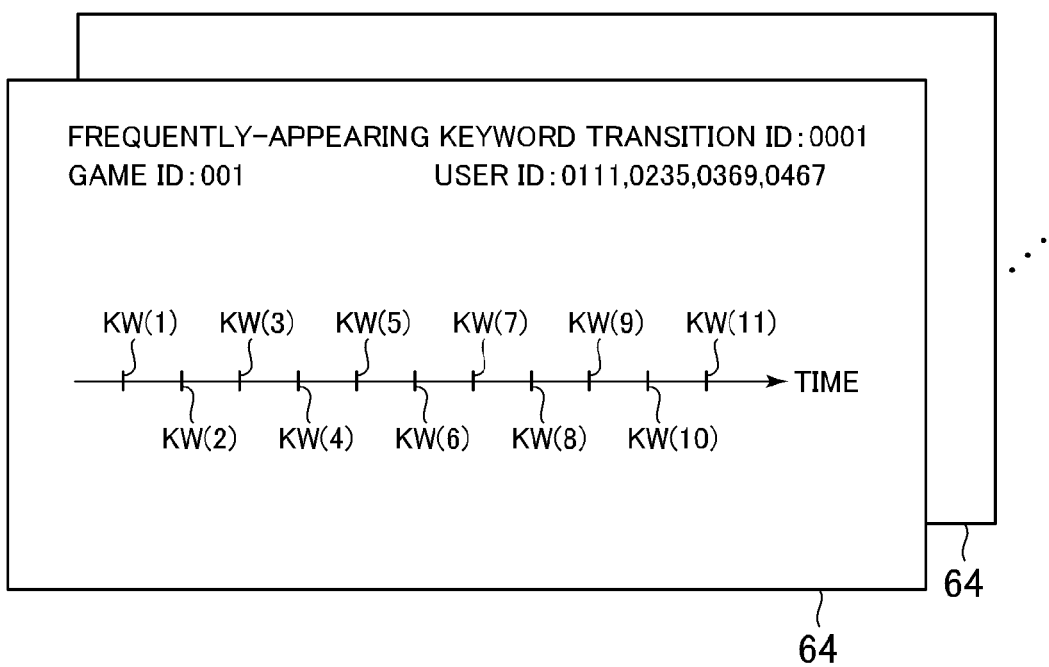
FIG. 12 is a diagram illustrating an example of frequently-appearing keyword transition data.

Then, after the processing illustrated as the above-mentioned Step S104 is finished, the keyword management unit 34 executes the generation and storing of progress status-keyword correspondence data 58 as illustrated in FIG. 9 (S105) and the generation and storing of frequently-appearing keyword transition data 64 as illustrated in FIG. 12 (S106). The keyword management unit 34 may execute the processing illustrated as Steps S105 and S106 either in parallel or in order. Further, the processing illustrated as Steps S105 and S106 is executed in an arbitrary order.

In the processing illustrated as Step S105, for each of the games represented by the game master data, the keyword management unit 34 generates the progress status-keyword correspondence data 58 exemplified in FIG. 9, and stores the progress status-keyword correspondence data 58 in the data storage unit 30. The progress status-keyword correspondence data 58 includes, for example, a progress status-keyword correspondence ID being an identifier of the progress status-keyword correspondence data 58, the game ID of the game corresponding to the progress status-keyword correspondence data 58, the progress status name within the game, and the keyword data representing at least one word brought into correspondence with a combination of the game ID and the progress status name. In this embodiment, the keyword management unit 34 sets, for example, as the word represented by the keyword data brought into correspondence with the combination of the game ID and the progress status name, a word satisfying any one of the following conditions: (1) being the progress status correspondence word associated with the combination of the game ID and the progress status name in the progress status name management data 52; (2) being a word that is determined by a known language processing technology to be similar to the progress status correspondence word associated with the combination of the game ID and the progress status name in the progress status name management data 52 from among the words represented by the keyword data associated with the game ID in the related keyword dictionary data 56; and (3) being a word that is determined by the known language processing technology to be similar to the progress status name from among the words represented by the keyword data associated with the game ID in the related keyword dictionary data 56 and the blog constituent words associated with the game ID in the blog article management data 54. In this manner, for each of combinations of the game ID and the progress status name, the progress status-keyword correspondence data 58 brought into correspondence with the combination is generated.

In the processing illustrated as Step S106, first, based on the blog article management data 54, the keyword management unit 34 generates a histogram 60 brought into correspondence with each of the games represented by the game master data. FIG. 10 is a diagram illustrating an example of the histograms 60. FIG. 10 illustrates the histogram 60 regarding a game A and the histogram 60 regarding a game B. In the histograms 60, for example, a horizontal axis thereof indicates a time that has passed after the released date/time of the game until the posted date/time of the blog article (hereinafter, referred to as "elapsed time at the time of posting"), and a vertical axis thereof indicates an appearance frequency, for each of the words set as the keyword data of the related keyword dictionary data 56 including the game ID of the game brought into correspondence with the histograms 60, by the number of blog articles including the each of the words posted within the time corresponding to each of segments obtained by dividing the elapsed time at the time of posting at predetermined time intervals. The appearance frequency is calculated based on the blog text data included in the blog article management data 54.

Then, for each of the histograms 60 brought into correspondence with the game, the keyword management unit 34 identifies a word whose histogram 60 is similar to another game and a word whose elapsed time at the time of posting has a standard deviation equal to or larger than a predetermined value. Here, the word concerned is handled as the word whose histogram 60 is similar to another game in a case where, for example, there exists the histogram 60 regarding another game having an overlap in the range from a value ((average value of the elapsed time at the time of posting within the blog article including the word concerned)−(standard deviation of the elapsed time at the time of posting within the blog article including the word concerned)*2) to a value ((average value of the elapsed time at the time of posting within the blog article including the word concerned)+(standard deviation of the elapsed time at the time of posting within the blog article including the word concerned)*2). Note that, a method of identifying the word whose histogram 60 is similar to another game is not limited to the above-mentioned method. Then, the keyword management unit 34 identifies, as a screened keyword, at least one word obtained by excluding the word identified as described above from the words set as the keyword data of the related keyword dictionary data 56. In this manner, the screened keyword is identified for each of the games.

In FIG. 10, the words set as the keyword data are expressed as KW(1), KW(12), KW(13), and KW(21). In the histograms 60 illustrated in FIG. 10, the histogram 60 of KW(12) regarding the game A is similar to the histogram 60 of KW(12) regarding the game B. For this reason, KW(12) is not employed either as the screened keyword of the game A or the screened keyword of the game B. Further, in the histograms 60 illustrated in FIG. 10, KW(13) with the standard deviation of the time that has passed after a released time point until a posted time point of the blog article having a value equal to or larger than a predetermined value within the histogram 60 regarding the game A is not employed either as the screened keyword regarding the game A. Then, KW(1) which is not similar to the histogram 60 regarding the game B and which has the standard deviation not having the value equal to or larger than the predetermined value within the histogram 60 regarding the game A is employed as the screened keyword regarding the game A, while KW(21) which is not similar to the histogram 60 regarding the game A and which has the standard deviation not having the value equal to or larger than the predetermined value within the histogram 60 regarding the game B is employed as the screened keyword regarding the game B.

Figure 11:
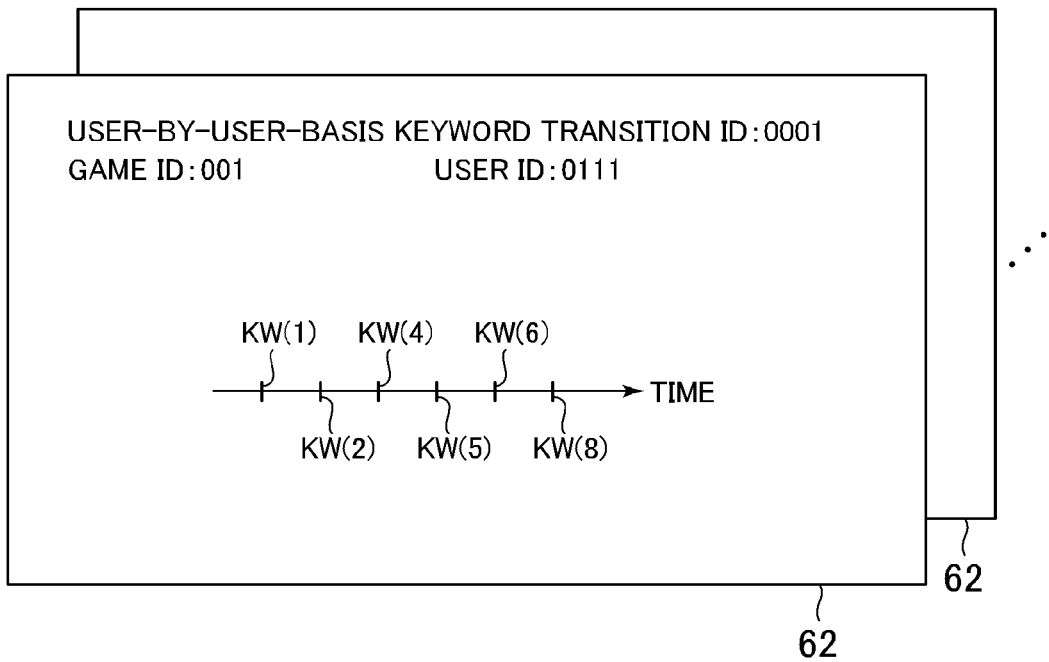
FIG. 11 is a diagram illustrating an example of user-by-user-basis keyword transition data.

Then, for each of combinations of the game and the user, the keyword management unit 34 generates user-by-user-basis keyword transition data 62 exemplified in FIG. 11, and stores user-by-user-basis keyword transition data 62 in the data storage unit 30. The user-by-user-basis keyword transition data 62 includes, for example, a user-by-user-basis keyword transition ID being an identifier of the user-by-user-basis keyword transition data 62, the game ID, the user ID, and element group data representing a plurality of ordered words brought into correspondence with the combination of the game and the user. In FIG. 11, the plurality of ordered words represented by the element group data are respectively expressed as KW(1), KW(2), KW(4), KW(5), KW(6), and KW(8). Based on the blog article management data 54, for each of the screened keywords brought into correspondence with the game identified by the game ID, the keyword management unit 34 confirms whether or not there exists the blog article which is the blog article of the user identified by the user ID and which includes the screened keyword. Then, the keyword management unit 34 generates data obtained by ordering at least one screened keyword included in the blog article whose existence has been confirmed in chronological order of the posted timing of the blog article including the screened keyword, and sets the data as the element group data included in the user-by-user-basis keyword transition data 62. In this manner, the user-by-user-basis keyword transition data 62 each piece of which is brought into correspondence with the combination of the user and the game is generated.

Then, for each of the games, the keyword management unit 34 generates at least one piece of frequently-appearing keyword transition data 64 exemplified in FIG. 12, and stores the at least one piece of frequently-appearing keyword transition data 64 in the data storage unit 30. The frequently-appearing keyword transition data 64 includes, for example, a frequently-appearing keyword transition ID being an identifier of the frequently-appearing keyword transition data 64, the game ID, the element group data representing a plurality of screened keywords that are ordered, and the user ID of at least one user brought into correspondence with the frequently-appearing keyword transition data 64. In FIG. 12, the plurality of screened keywords that are ordered, which are represented by the element group data, are respectively expressed as KW(1), KW(2), KW(3), KW(4), KW(5), KW(6), KW(7), KW(8), KW(9), KW(10), and KW(11).

The keyword management unit 34, for example, handles the element group data as a graph (handles the screened keywords represented by the element group data as nodes, and handles an order relationship among the screened keywords represented by the element group data as a directed link that is directed from the earlier posted date/time corresponding thereto toward the later one), and then identifies a high-frequency graph including a predetermined or larger number thereof by a known graph mining method such as apriori-based graph mining (AGM). Then, the keyword management unit 34 brings the nodes that form the high-frequency graph into correspondence with the screened keywords represented by the element group data within the frequently-appearing keyword transition data 64, and brings the directed link that forms the high-frequency graph into correspondence with the order relationship among the screened keywords represented by the element group data within the frequently-appearing keyword transition data 64. Further, the keyword management unit 34 sets the user ID included in the user-by-user-basis keyword transition data 62 determined by the known graph mining method as including the above-mentioned high-frequency graph (user-by-user-basis keyword transition data 62 serving as a basis for generating the frequently-appearing keyword transition data 64) as the user ID included in the frequently-appearing keyword transition data 64.

Figure 13:
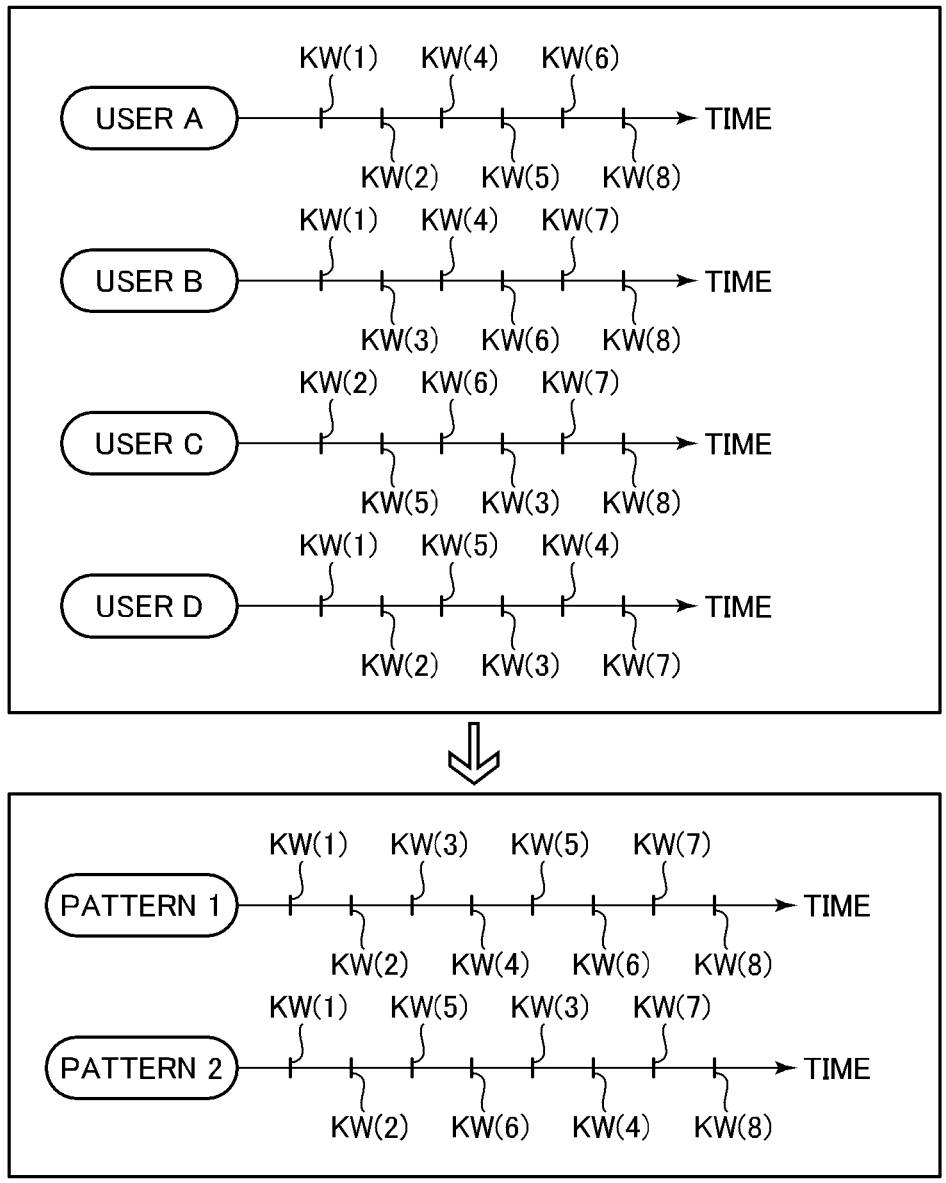
FIG. 13 is a diagram illustrating an example of how element group data included in the frequently-appearing keyword transition data is generated.

Here, by referring to FIG. 13, a description is made of an example of how the element group data included in the frequently-appearing keyword transition data 64 is generated based on the element group data included in the user-by-user-basis keyword transition data 62. FIG. 13 illustrates the element group data included in the user-by-user-basis keyword transition data 62 brought into correspondence with each of a user A, a user B, a user C, and a user D with regard to a given game. Here, based on the element group data corresponding to the user A and the element group data corresponding to the user B, the keyword management unit 34 generates the element group data indicated by a pattern 1. Then, based on the element group data corresponding to the user C and the element group data corresponding to the user D, the keyword management unit 34 generates the element group data indicated by a pattern 2. Then, the keyword management unit 34 generates the frequently-appearing keyword transition data 64 including the element group data indicated by the pattern 1 and the frequently-appearing keyword transition data 64 including the element group data indicated by the pattern 2. At this time, the user IDs of the user A and the user B are set as the user ID included in the frequently-appearing keyword transition data 64 including the element group data indicated by the pattern 1, and the user IDs of the user C and the user D are set as the user ID included in the frequently-appearing keyword transition data 64 including the element group data indicated by the pattern 2.

In some games, a plurality of sequences of clearing stages thereof are set. In such a case, it is conceivable that the order in which the screened keywords appear in the posted blog article differs among the users who have cleared the stages in different sequences. In this case, it can be highly probable that the plurality of pieces of frequently-appearing keyword transition data 64 corresponding to one game are generated.

Then, after the processing illustrated as Steps S105 and S106 is finished, for each of the pieces of frequently-appearing keyword transition data 64, the keyword management unit 34 executes the generation and storing of the frequently-appearing keyword transition data with the progress status 50 as illustrated in FIG. 4 based on the frequently-appearing keyword transition data 64 (S107). The frequently-appearing keyword transition data with the progress status 50 is the same data as the frequently-appearing keyword transition data 64 except that the progress status is associated with at least a part of the screened keywords represented by the included element group data. In the processing illustrated as Step S107, first, the keyword management unit 34, for example, confirms whether or not there exists: a word represented by the keyword data included in any one piece of progress status-keyword correspondence data 58 brought into correspondence with the game identified by the game ID, among the screened keywords represented by the element group data included in the frequently-appearing keyword transition data 64; or a word similar to the word represented by the keyword data included in any one piece of progress status-keyword correspondence data 58 brought into correspondence with the game identified by the game ID, which is identified based on a known thesaurus.

Then, with regard to the existing word, the keyword management unit 34 generates the frequently-appearing keyword transition data with the progress status 50 which includes the element group data in which the progress status name brought into correspondence with the word in the progress status-keyword correspondence data 58 is associated with the screened keyword to be brought into correspondence therewith, and stores the frequently-appearing keyword transition data with the progress status 50 in the data storage unit 30.

In the above-mentioned manner, the frequently-appearing keyword transition data with the progress status 50 is stored in the data storage unit 30 of the information providing system 10 according to this embodiment. Further, as described above, in this embodiment, the keyword management unit 34 also plays a role of a data generation unit that generates the progress status-keyword correspondence data 58, the histogram 60, the user-by-user-basis keyword transition data 62, the frequently-appearing keyword transition data 64, and the frequently-appearing keyword transition data with the progress status 50.

Note that, processing for generating the frequently-appearing keyword transition data with the progress status 50 is not limited to the processing illustrated in the above-mentioned processing example. For example, in the above-mentioned processing illustrated as Step S106, for each of the combinations of the game and the user, with regard to at least a part of the screened keywords represented by the element group data included in the user-by-user-basis keyword transition data 62, the keyword management unit 34 may generate user-by-user-basis keyword transition data with the progress status which is associated with the identified progress status and may store the data in the data storage unit 30 in the same manner as the above-mentioned processing illustrated as Step S107.

Further, the keyword management unit 34 may generate the frequently-appearing keyword transition data with the progress status 50 based on the frequently-appearing keyword transition data 64 and the progress status management data 20 stored in the game management system 12. For example, the keyword management unit 34 may acquire the progress status management data 20 regarding the user corresponding to the user-by-user-basis keyword transition data 62 from the game management system 12, and may identify occurrence order of any one event of the posting of the blog article and the achievement of a condition corresponding to the progress status management data 20 based on the date/time represented by the achievement date/time data included in the progress status management data 20 and the posted date/time of the blog article including any one of the screened keywords brought into correspondence with the game identified by the game ID. Then, the keyword management unit 34 may generate the user-by-user-basis keyword transition data with the progress status in which the screened keywords and execution statuses that are ordered in chronological order of the occurrence timing of the event are set as the element group data, and may generate the frequently-appearing keyword transition data with the progress status 50 based on the user-by-user-basis keyword transition data with the progress status. In this case, each of the elements represented by the element group data included in the user-by-user-basis keyword transition data with the progress status is brought into correspondence with any one of the screened keyword and the execution status.

Figure 14:
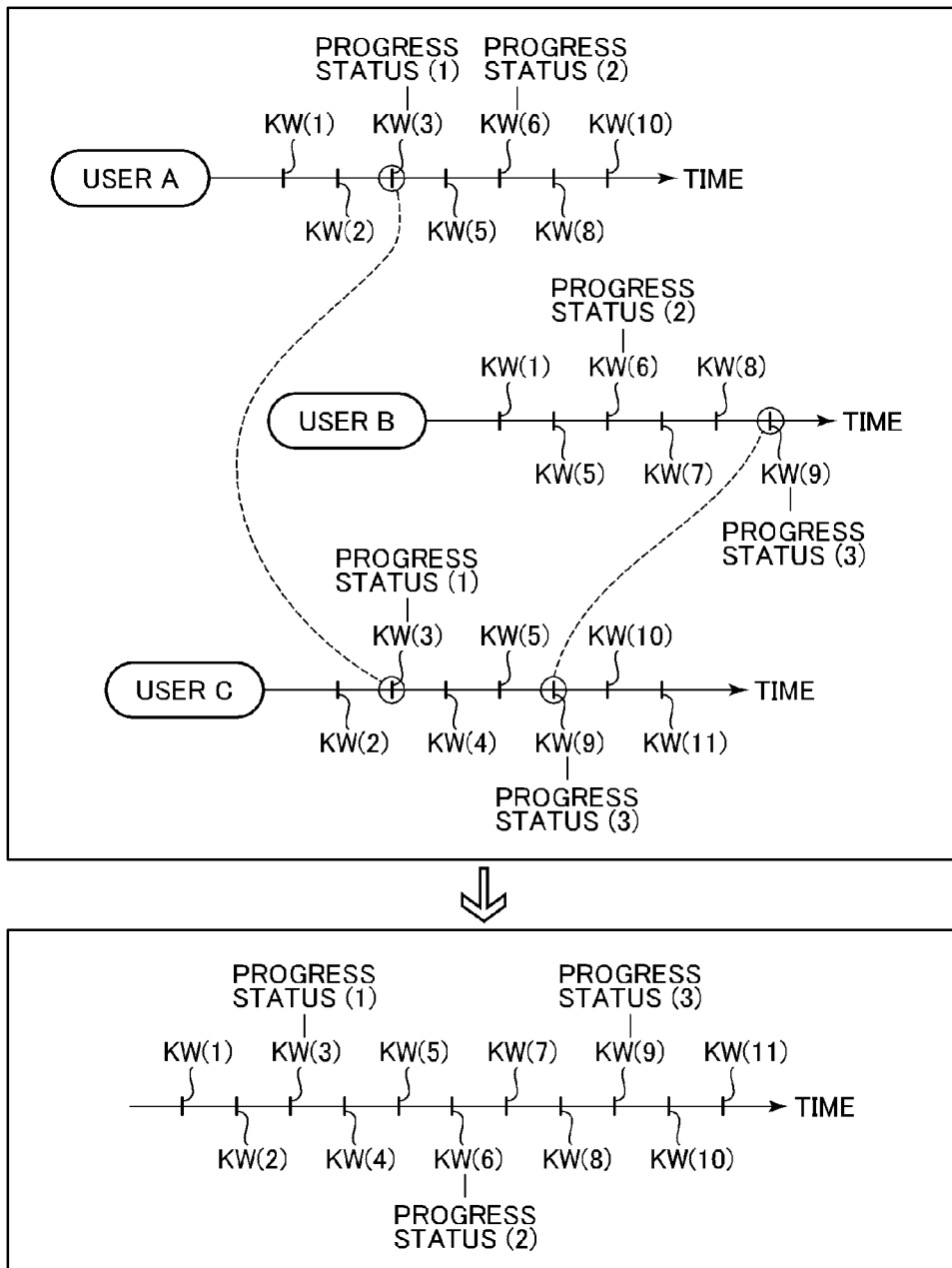
FIG. 14 is a diagram illustrating an example of how element group data included in the frequently-appearing keyword transition data with the progress status is generated.

FIG. 14 is a diagram illustrating an example of how the frequently-appearing keyword transition data with the progress status 50 is generated based on the user-by-user-basis keyword transition data with the progress status. Here, the keyword management unit 34, for example, identifies the plurality of pieces of user-by-user-basis keyword transition data with the progress status serving as a basis for generating the frequently-appearing keyword transition data with the progress status 50 in the above-mentioned manner, and as illustrated in FIG. 14, performs aggregation of the elements associated with the progress status (in the example of FIG. 14, the screened keywords) with regard to the identified user-by-user-basis keyword transition data with the progress status, followed by aggregation of the other elements. In the example of FIG. 14, the aggregation is performed in terms of the order relationship relating to KW(3) associated with the progress status (1), KW(6) associated with the progress status (2), and KW(9) associated with the progress status (3), followed by the aggregation of the other elements, and the element group data included in the frequently-appearing keyword transition data with the progress status 50, which is illustrated in the lower part of FIG. 14, is generated. Note that, the user ID included in the user-by-user-basis keyword transition data with the progress status serving as the basis for generating the frequently-appearing keyword transition data with the progress status 50 is set as the user ID included in the frequently-appearing keyword transition data with the progress status 50.

Figure 15:
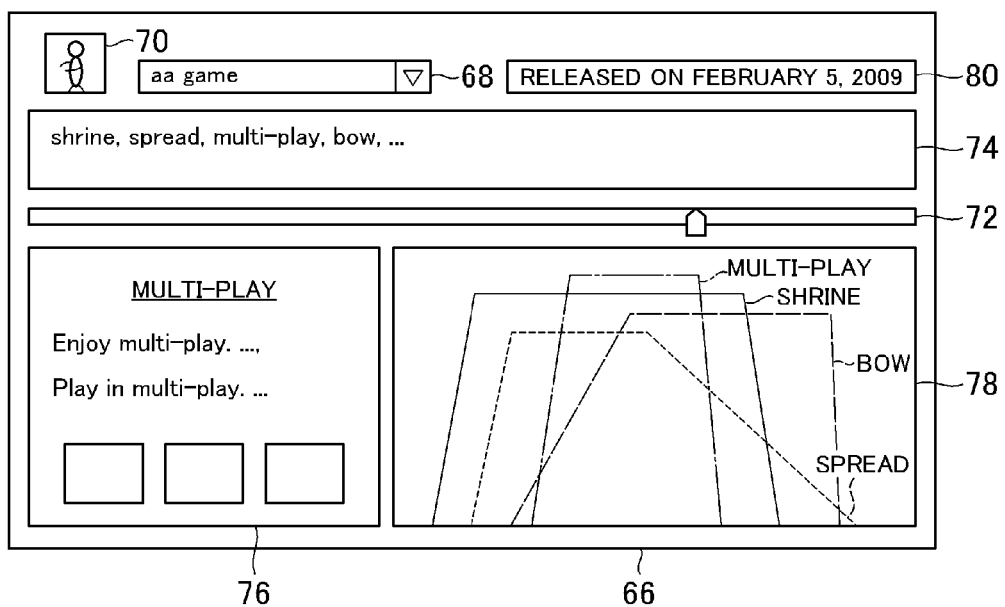
FIG. 15 is a diagram illustrating an example of an information providing page.

In the information providing system 10 according to this embodiment, the information providing unit 40 generates an information providing page 66 exemplified in FIG. 15 in response to a request which is made by the user who has logged in to the information providing system 10 and which is received from the client 16. Then, the information providing unit 40 transmits the information providing page 66 to the client 16. Under the condition that receiving the information providing page 66, the client 16 displays the information providing page 66 on the display.

The information providing unit 40 generates the information providing page 66 including a pulldown menu 68, a game-representing image placement area 70, a slide bar 72, a keyword display area 74, a blog display area 76, a histogram display area 78, and a game-released date display area 80. In the pulldown menu 68, character strings of the game titles of the respective games represented by the game master data are placed, and the user is allowed to select anyone of the character strings of the game titles. Under the condition that the character string of the game title is selected by the user, an image placed in the game-representing image placement area 70 is updated to an image representative of the game the character string of the game title of which has been selected, the histogram 60 placed in the histogram display area 78 is updated to the histogram 60 of the game the character string of the game title of which has been selected, and the date/time placed in the game-released date display area 80 is updated to the released date/time of the game the character string of the game title of which has been selected.

The slide bar 72 is brought into correspondence with a timeline flowing from the left to the right with the left edge corresponding to the released date/time of the game and the right edge corresponding to the present date/time. A position of a knob of the slide bar 72 is brought into correspondence with one time point between the released date/time of the game and the present date/time. For example, the time point brought into correspondence with the position of the knob of the slide bar 72 is calculated based on a mathematical expression, for example, (released date/time of the game)+(time from released date/time of the game until the present date/time)*(length from the left edge of the slide bar 72 to the position of the knob)/(length of the slide bar 72).

Placed in the keyword display area 74 are the screened keywords that appear a predetermined or larger number of times within a time segment including the time point corresponding to the position of the knob of the slide bar 72. When the knob of the slide bar 72 is caused to move by the user, the keywords placed in the keyword display area 74 are updated to the screened keywords that appear the predetermined or larger number of times within the time segment including the time point corresponding to the position of the knob that has been caused to move. Note that, the above-mentioned important word among the screened keywords displayed in the keyword display area 74 may be displayed in a display mode different from the other screened keywords (for example, highlighted). Further, the keyword display area 74 may be configured to have only the screened keyword being the above-mentioned important word placed therein.

The screened keyword placed in the keyword display area 74 is a text that can be selected by the user. Under the condition that the screened keyword is selected by the user, the text of the blog article including the screened keyword and the related image of the blog article (representative image of a moving image if the related image is the moving image) are placed in the blog display area 76. Note that, each time the screened keyword is selected by the user, the text and the image placed in the blog display area 76 are updated to the text of the blog article including the selected screened keyword and the related image of the blog article. Note that, the information providing unit 40 may be configured to place, in the blog display area 76, the name of the game title selected from the pulldown menu 68, and the blog article and the related image that are acquired by executing a search using the progress status name or the like as the search condition on the web server 14. Further, the information providing unit 40 may be configured to place, in the blog display area 76, information stored in the game management system 12 (for example, information relating to additional download content relating to the screened keyword or official strategy information on the game).

Figure 16:
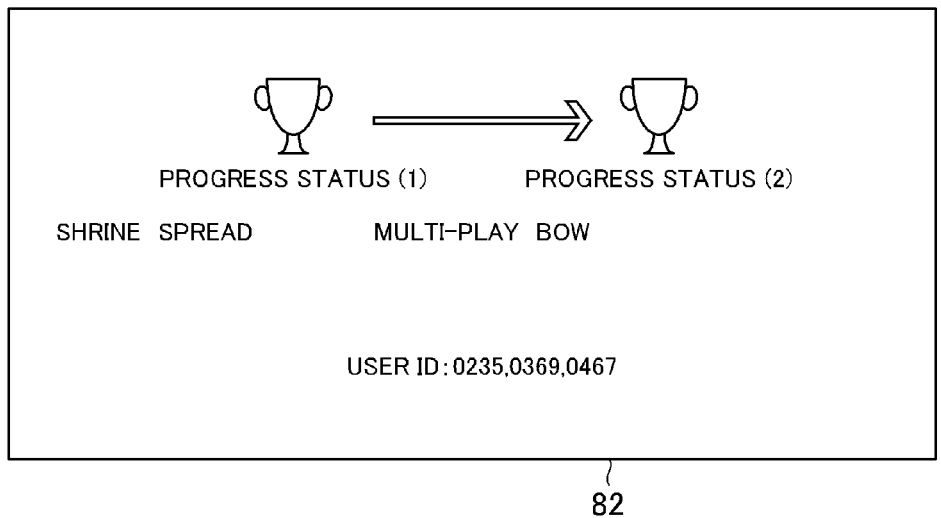
FIG. 16 is a diagram illustrating an example of an achievement status displaying page.
Figure 17:
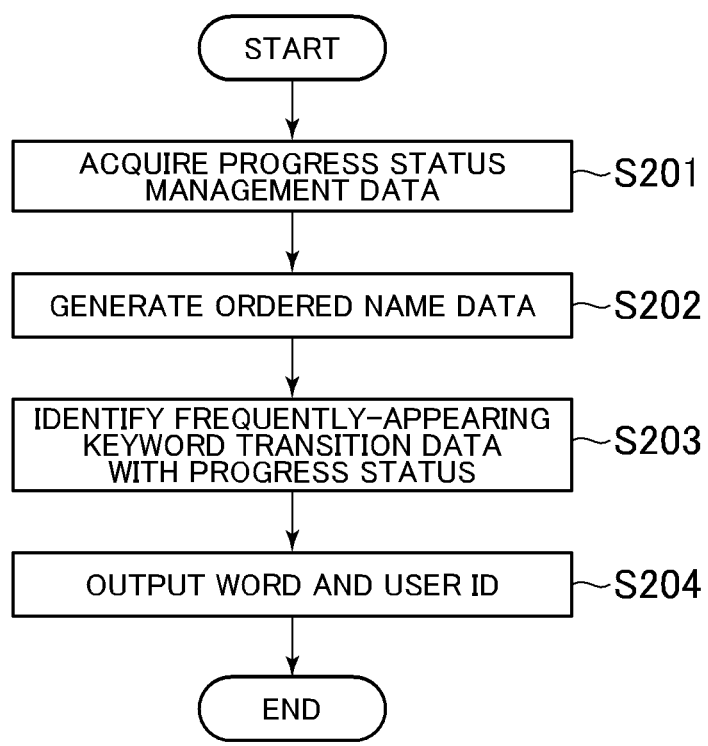
FIG. 17 is a flowchart illustrating an example of a flow of processing performed by the information providing system according to the embodiment of the present invention.

Further, in this embodiment, for example, after the user logs in to the game management system 12, under the condition that the client 16 of the user outputs an output request for an achievement status displaying page 82 regarding the game being played by the user, which is exemplified in FIG. 16, to the game management system 12, the game management system 12 transmits at least one piece of progress status management data 20 including the user ID of the user and the game ID of the game to the information providing system 10. In response to reception of the progress status management data 20 transmitted from the game management system 12, the information providing system 10 according to this embodiment outputs data brought into correspondence with the progress status of the game of the user represented by the received progress status management data 20 to the game management system 12. Here, by referring to a flowchart exemplified in FIG. 17, a description is made of an example of a flow of processing for outputting data to the game management system 12 which is performed by the information providing system 10 according to this embodiment.

First, the data acquisition unit 36 acquires a piece of progress status management data 20 with the achievement management data set to the value "achieved" from among the pieces of progress status management data 20 received from the game management system 12 (S201). Then, the transition data identifying unit 38 generates the ordered name data in which the names of the progress status management data 20 are placed in chronological order of the date/time represented by the achievement date/time data included in the progress status management data 20 acquired in the processing illustrated as Step S201 (S202). Then, the transition data identifying unit 38 identifies the frequently-appearing keyword transition data with the progress status 50 which includes the game ID included in the received progress status management data 20 (S203). Here, in a case where there exist a plurality of pieces of frequently-appearing keyword transition data with the progress status 50 which include the game ID included in the received progress status management data 20, from among those plurality of pieces of frequently-appearing keyword transition data with the progress status 50, the transition data identifying unit 38 identifies the frequently-appearing keyword transition data with the progress status 50 in which the order of the elements corresponding to the progress statuses or the words (progress status correspondence words) brought into correspondence with the names within the ordered name data (progress status names) is most similar to the order within the element group data included in the frequently-appearing keyword transition data with the progress status 50. For example, in a case where there exists the frequently-appearing keyword transition data with the progress status 50 in which the order of the elements corresponding to the progress statuses or the words (progress status correspondence words) brought into correspondence with the names within the ordered name data (progress status names)

matches the order within the element group data included in the frequently-appearing keyword transition data with the progress status 50, the transition data identifying unit 38 identifies the above-mentioned frequently-appearing keyword transition data with the progress status 50. For example, in a case where the order of the names within the ordered name data is the progress status (1) and the progress status (2), the transition data identifying unit 38 identifies the frequently-appearing keyword transition data with the progress status 50 which includes the element group data in which the order position of the element corresponding to the progress status (1) precedes the order position of the element corresponding to the progress status (2) as illustrated in, for example, FIG. 4.

Then, the information providing unit 40 outputs at least one word brought into correspondence with the element the position of which precedes that of the element corresponding to the progress status (2) (element the position of which precedes that of the element corresponding to the progress status that was last reached by the user) and at least one user ID included in the identified frequently-appearing keyword transition data with the progress status 50, to the game management system 12 (S204).

In this manner, the game management system 12 is provided with the at least one word and the at least one user ID that are brought into correspondence with the progress status. Then, in this embodiment, the game management system 12 generates the achievement status displaying page 82 in which the provided word and the user ID are placed, and transmits the achievement status displaying page 82 to the client 16 being a request source for the achievement status displaying page 82. When receiving the achievement status displaying page 82, the client 16 displays the achievement status displaying page 82 on the display.

Note that, in the processing illustrated as Step S204, the information providing unit 40 may be configured to output at least one word brought into correspondence with an element subsequent to the element corresponding to the progress status (2) (element the order position of which is subsequent to that of the element corresponding to the progress status that was last reached by the user) to the game management system 12. Alternatively, in the processing illustrated as Step S204, the information providing unit 40 may be configured to output at least one word brought into correspondence with an element that is different in the order position from the element corresponding to the progress status (2) by a predetermined or smaller number (element in the vicinity of the element corresponding to the progress status that was last reached by the user) to the game management system 12. Then, the game management system 12 may be configured to generate the achievement status displaying page 82 on which a word provided from the information providing unit 40 is placed.

In this manner, in the information providing system 10 according to this embodiment, a given user is provided with the keyword included in the blog article of another user the progress of the game of which is brought into correspondence with that of the given user and the user ID thereof, which promotes the sharing of gaming experiences among a plurality of users.

Note that, the present invention is not limited to the above-mentioned embodiment.

For example, in the above-mentioned embodiment, the keyword and the user ID that are brought into correspondence with the progress status management data 20 are identified based on the progress status management data 20 representing a game clearance status and an item acquisition status, but, for example, the related image (still image or moving image) of the blog article including the keyword, a cumulative number of played days, a cumulative number of played times, a cumulative played time period, and the like, for which another user has played the game, may be identified based on the progress status management data 20. Further, the keyword and the user ID brought into correspondence with the progress status management data 20, the related image (still image or moving image) of the blog article including the keyword, the cumulative number of played days, the cumulative number of played times, and the cumulative played time period, for which another user has played the game, and the like may be identified based on a cumulative number of played days, a cumulative number of played times, a cumulative played time period, and the like, for which the user has played the game.

Further, information provided to the user having the progress status management data 20 managed by the game management system 12 may be either information representing the progress status of the game of another user having the progress status management data 20 managed by the game management system 12 or information representing the progress status of the game of another user not having the progress status management data 20 managed by the game management system 12.

Further, for example, it is not necessary for the game management system 12 to manage users. Further, for example, in response to a request made by the user received from the client 16, the information providing system 10 may be configured to identify the frequently-appearing keyword transition data with the progress status 50 which includes the user ID of the user. Further, the information providing system 10 may be configured to generate a page on which the text of the blog article posted by the user identified by the user ID of another user, which is included in the frequently-appearing keyword transition data with the progress status 50 and which includes the words represented by the element group data included in the frequently-appearing keyword transition data with the progress status 50, is placed and transmit the page to the client 16 being the request source. Further, the client 16 that has received the page may be configured to display the page on the display.

Further, for example, the same processing as the processing illustrated as Step S102 according to the above-mentioned embodiment may be executed on the comment posted to the electronic bulletin board. Further, based on the order of the posted date/time of the comment with respect to the electronic bulletin board, the order of the words represented by the element group data included in the user-by-user-basis keyword transition data 62 may be determined.

Further, the information providing system 10 according to this embodiment may be applied to a scene for sharing experience contents other than the gaming experiences (for example, contents of learning experiences through learning content, contents of operation experiences of application software, experience contents of a diet, a smoking cessation, a muscular training, or the like, and the transition of music, hobby, liquor, or the like in which the user is interested) among the users.

For example, the information providing system 10 may be configured to execute the above-mentioned processing by using experience contents data representing the experience contents of the user, such as data for managing the progress status of the learning through the learning content that causes the plurality of stages to be learned sequentially one by one or data for managing the progress status of a tutorial for application software, instead of the progress status management data 20. Further, a given user may be provided with information such as a keyword extracted from the blog article or the like of another user whose progress status of the learning or progress status of the tutorial is common to the given user.

Further, in the same manner, the information providing system 10 may be configured to, for example, provide a given user with the blog article of another user whose progress status of the diet, the smoking cessation, the muscular training, or the like is common to the given user, the blog article of another user whose transition of music, hobby, liquor, or the like in which the another user is interested is common to the transition of music, hobby, liquor, or the like in which the given user is interested, and the like.

Further, the information providing system 10 may be configured to, for example, provide the user with words and phrases that are included in the blog articles of a predetermined or larger number of users. Further, the information providing system 10 may be configured to, for example, classify the users who post blog articles into clusters in terms of preferences, progress speed of experiences, or the like and provide a given user with information such as the blog article of another user belonging to the cluster common to the given user.

Further, for example, the information providing system 10 may be configured to determine, based on the progress status management data 20 brought into correspondence with the user's blog article or the user, that the progress of the user's experience is at a standstill in a case of satisfying a condition, for example, that the blog article is posted by the user with a frequency equal to or smaller than a predetermined number or that the progress status management data 20 brought into correspondence with the user is updated with a frequency equal to or smaller than a predetermined number. For example, the information providing system 10 may be configured to provide more information to the user who has been determined to have the progress of the experience at a standstill than to the user who has not.

Further, for example, the information providing system 10 may be configured to search the user's blog articles or the like for the blog article or the like satisfying the predetermined condition such as including the game title and execute semantic analysis the words and phrases included in the retrieved blog article or the like. Further, the information providing system 10 may be configured to identify the number of positive words and phrases included in the user's blog article or the like and the number of negative words and phrases included therein based on a result of the analysis of the meaning thereof. Further, the information providing system 10 may be configured to determine whether or not the user is discouraged based on the number. Specifically, the information providing system 10 may be configured to, for example, determine that the user is discouraged in a case where a predetermined or larger number of negative words and phrases are included, a case where there are more negative words and phrases than the positive words and phrases, or other such case. Further, the information providing system 10 may be configured to provide more information to the user who has determined to be discouraged than to the user who has not.

Further, the information providing system 10 may be configured to, for example, provide the user with information indicating the number of users who are making progress in the game or the like without being discouraged, a ratio of the number of users who are making progress in the game or the like without being discouraged to the whole users, and the like. Further, the information providing system 10 may be configured to, for example, provide the user with information indicating a period passing after another user started the game or the like until each of the progress statuses (for example, progress status (1), progress status (2), . . . ) is reached.

Further, the information providing system 10 may be configured to provide the user with information indicating, in a case where there exist a plurality of finally-reached progress statuses (final progress statuses), the number of users who have reached the respective final progress statuses, a ratio of the number of users who have reached the respective final progress statuses to the whole users, and the like.

Further, the information providing system 10 may be configured to provide the user with the blog article or the like in which a review is written by the user who has reached the final progress status. Note that, here, the information providing system 10 may be configured to exclude, by using the known language processing technology, the blog article including the predetermined contents that should not be known to a provision destination user in order to make progress, from subjects to be provided to the user.

Further, for example, the information providing system 10 may be configured to, for example, identify a playing style, such as being short in the playing time but large in the billing amount or being small in the billing amount but long in the playing time, based on an execution history of a network game, a social game, or the like. Then, the information providing system 10 provide a given user with information such as the blog article of another user whose playing style is common to the given user.

Figure 18:
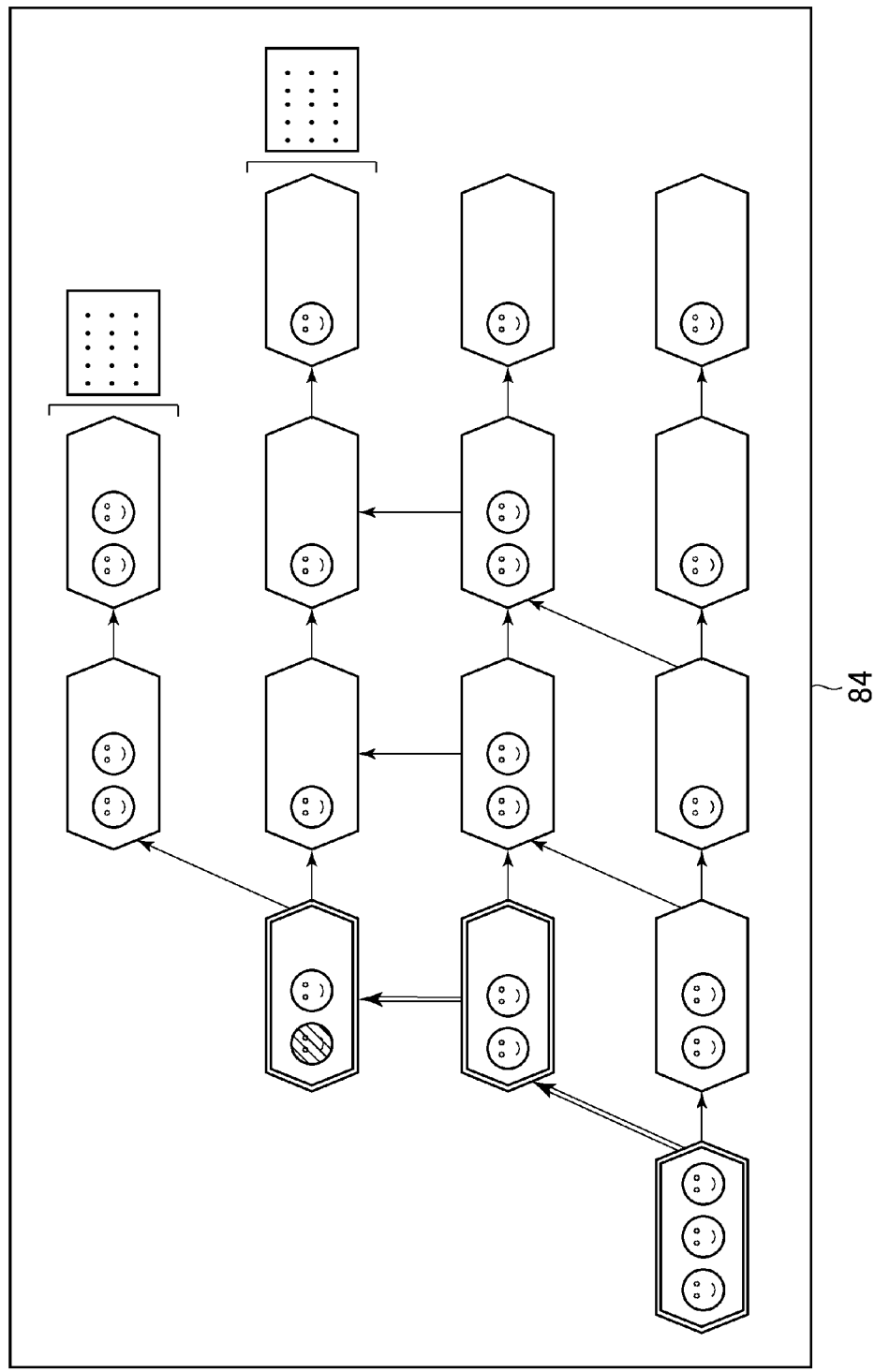
FIG. 18 is a diagram illustrating an example of a progress page.

Further, for example, the information providing system 10 may be configured to provide a progress page 84 as exemplified in FIG. 18 with regard to the experience contents of the user which are to branch off into a plurality of parts. Placed on the progress page 84 exemplified in FIG. 18 are, for example, an image representing the progress status (in FIG. 18, expressed by a hexagon), an image representing the order relationship between the progress statuses (in FIG. 18, expressed by an arrow directed from the image representing the progress status toward the progress status subsequent to the progress status), and an image representing the number of users brought into correspondence with each of the progress statuses (for example, the number of users who have posted the blog article or the like corresponding to the progress status or the number of users who have currently reached the progress status) (in FIG. 18, the more users being expressed by the more images of faces). Further placed on the progress page 84 exemplified in FIG. 18 are images representing a current progress status that has been reached by the user to which the progress page 84 is provided and the progress statuses that had been passed before the current progress status has been reached. In FIG. 18, the hexagons representing the current progress status that has been reached by the user to which the progress page 84 is provided and the progress statuses that had been passed before the current progress status has been reached are expressed by the double lines. Further, in FIG. 18, the arrows representing the order relationship between those progress statuses are expressed by the double lines. Further, in FIG. 18, the image of the face expressed by the hatched lines is placed in the hexagon representing the current progress status that has been reached by the user to which the progress page 84 is provided. Further placed on the progress page 84 exemplified in FIG. 18 is detailed information about each of paths through the progress statuses which can be passed by the user to which the progress page 84 is provided in the future (in FIG. 18, expressed as the text placed within a rectangular frame).

Further, for example, the information providing system 10 may be configured to determine the words and phrases to be provided based on the words and phrases included in the blog article or the like posted before the released date/time of the game.

For example, the information providing system 10 may be configured to search for the blog article posted before the released date/time of the game, which satisfies a condition such as including the game title. Further, the information providing system 10 may be configured to identify an expectation element being an element expected for the game by the user who has posted the blog article (for example, speediness or graphics) based on the words and phrases included in the blog article. The information providing system 10 may be configured to identify, in a case where, for example, the word "speediness" is included, that the expectation element of the user who has posted the blog article is the speediness. Further, for each of the above-mentioned expectation elements, the information providing system 10 may be configured to search for the blog articles posted by a user group brought into correspondence with the expectation elements after the released date/time of the game, which satisfy a condition such as including the game title of the game. Then, the information providing system 10 may be configured to identify a degree of a ground swell of interest which is brought into correspondence with the expectation element. Here, the information providing system 10 may be configured to identify, for example, the number of positive words and phrases included in the retrieved blog article, a post count per unit time, and a total post count after the released date/time of the game, as indices indicating the degree of the ground swell of interest.

Further, the information providing system 10 may be configured to provide the user with the words and phrases or the like included in the blog article posted by the user brought into correspondence with the expectation element whose degree of the ground swell of interest is higher than the other expectation elements.

Further, for example, the information providing system 10 may be configured to provide the user with the words and phrases obtained by excluding the words and phrases extracted from the blog article posted before the released date/time of the game from the words and phrases extracted from the blog article posted after the released date/time of the game.

Further, the roles to be played by the information providing system 10, the game management system 12, the web server 14, and the client 16 according to this embodiment are not limited to the above-mentioned ones. Further, the specific character strings and numerical values described above and the specific character strings and numerical values illustrated in the accompanying drawings are merely examples, and the present invention is not limited to those character strings or numerical values.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing device, comprising:
   an acquisition unit configured to: (i) acquire information according to experience contents of a provision destination user, the provision destination user being a user to which information is to be provided, where the information according to the experience contents of the provision destination user include progress of a game in which the provision destination user has engaged in gameplay, and (ii) acquire document information stored in a social media system in which content is made public;
   an information identifying unit configured to identify information according to experience contents of a provision source user, the provision source user being a user whose said experience contents are brought into correspondence, based at least in part on one or more appearance frequencies of keywords, with the experience contents of the provision destination user; and
   an information providing unit configured to provide the provision destination user with the information according to the experience contents of the provision source user and the document information.

2. The information processing device according to claim 1, further comprising
   a data generation unit that generates data representing a plurality of words ordered in accordance with an order of experiences based on information according to the experience contents of the user, wherein the information providing unit provides the provision destination user with information according to a word identified from among the plurality of words based on information representing the experience contents of the provision destination user.

3. The information processing device according to claim 2, wherein the data generation unit generates, based on a plurality of pieces of document information each of which is associated with a date/time, data in which a plurality of words included in the plurality of pieces of document information are ordered in accordance with an order of the date/time associated with each of the plurality of pieces of document information including the plurality of words.

4. The information processing device according to claim 2, wherein:
   the data generation unit generates a plurality of data pieces representing the plurality of words;
   the information processing system further comprises a data identifying unit that identifies, based on the information according to the experience contents of the provision destination user, at least one of the plurality of data pieces representing the plurality of words brought into correspondence with the information; and
   the information providing unit provides the provision destination user with information according to a word identified from among the plurality of words represented by the at least one of the plurality of data pieces identified by the data identifying unit.

5. The information processing device according to claim 2, wherein:
   the data generation unit generates the data representing the plurality of words based on a name of experience contents data representing the experience contents of the user stored in a management system that manages the experience contents of the user and the document information; and
   at least one of the plurality of words comprises a word brought into correspondence with the experience contents data, and at least one of the plurality of words comprises a word brought into correspondence with the document information.

6. The information processing device according to claim 1, wherein:
   the information identifying unit identifies information according to progress of the game of the provision source user being a user whose progress of the game is brought into correspondence with the progress of the game of the provision destination user;

and the information providing unit provides the provision destination user with information according to the progress of the game of the provision source user.

7. An information processing method, comprising: acquiring information according to experience contents of a provision destination user, the provision destination user being a user to which information is to be provided, where the information according to the experience contents of the provision destination user include progress of a game in which the provision destination user has engaged in gameplay;

acquiring document information stored in a social media system in which content is made public;

identifying information according to the experience contents of a provision source user, the provision sources user being a user whose said experience contents are brought into correspondence, based at least in part on one or more appearance frequencies of keywords, with the experience contents of the provision destination user;

and providing the provision destination user with the information according to the experience contents of the provision source user and the document information.

8. A program stored in a non-transitory computer readable information storage medium, which is to be executed by a computer, the program including instructions to:

acquire information according to experience contents of a provision destination user, the provision destination user being a user to which information is to be provided, where the information according to the experience contents of the provision destination user include progress of a game in which the provision destination user has engaged in gameplay;

acquire document information stored in a social media system in which content is made public;

identify information according to the experience contents of a provision source user, the provision source user being a user whose said experience contents are brought into correspondence, based at least in part on one or more appearance frequencies of keywords, with the experience contents of the provision destination user;

and provide the provision destination user with the information according to the experience contents of the provision source user and the document information.

9. A non-transitory computer readable information storage medium storing a program which is to be executed by a computer, the program including instructions to:

acquire information according to experience contents of a provision destination user, the provision destination user being a user to which information is to be provided, where the information according to the experience contents of the provision destination user include progress of a game in which the provision destination user has engaged in gameplay;

acquire document information stored in a social media system in which content is made public;

identify information according to the experience contents of a provision source user, the provision source user being a user whose said experience contents are brought into correspondence, based at least in part on one or more appearance frequencies of keywords, with the experience contents of the provision destination user; and provide the provision destination user with the information according to the experience contents of the provision source user and the document information.

* * * * *